US010001882B2

(12) United States Patent
Drumm

(10) Patent No.: US 10,001,882 B2
(45) Date of Patent: Jun. 19, 2018

(54) VIBRATED WAVEGUIDE SURFACE FOR OPTICAL TOUCH DETECTION

(71) Applicant: Rapt IP Limited, Mriehel (MT)

(72) Inventor: Owen Drumm, Dublin (IE)

(73) Assignee: Rapt IP Limited, Mriehel (MT)

( * ) Notice: Subject to any disclaimer, the term of this patent is extended or adjusted under 35 U.S.C. 154(b) by 0 days. days.

(21) Appl. No.: 15/366,583

(22) Filed: Dec. 1, 2016

(65) Prior Publication Data

US 2017/0160871 A1 Jun. 8, 2017

Related U.S. Application Data

(60) Provisional application No. 62/262,321, filed on Dec. 2, 2015.

(51) Int. Cl.
*G06F 3/042* (2006.01)
*G06F 3/041* (2006.01)

(52) U.S. Cl.
CPC .......... *G06F 3/0428* (2013.01); *G06F 3/0416* (2013.01); *G06F 2203/04104* (2013.01); *G06F 2203/04109* (2013.01)

(58) Field of Classification Search
None
See application file for complete search history.

(56) References Cited

U.S. PATENT DOCUMENTS

| | | | | |
|---|---|---|---|---|
| 5,977,867 A * | 11/1999 | Blouin | ................. | G06F 3/041 178/18.01 |
| 9,323,396 B2 * | 4/2016 | Han | ................. | G06F 3/0425 |
| 2009/0213093 A1 * | 8/2009 | Bridger | ................. | G06F 3/0421 345/175 |
| 2010/0193259 A1 * | 8/2010 | Wassvik | ................. | G06F 3/0423 178/18.09 |
| 2010/0207910 A1 * | 8/2010 | Liu | ................. | G06F 3/0416 345/175 |
| 2011/0074735 A1 * | 3/2011 | Wassvik | ................. | G06F 3/0421 345/175 |
| 2011/0163996 A1 | 7/2011 | Wassvik et al. | | |

(Continued)

FOREIGN PATENT DOCUMENTS

| | | |
|---|---|---|
| TW | 201415328 A | 4/2014 |
| WO | WO 2010/064983 A2 | 6/2010 |

OTHER PUBLICATIONS

Taiwan Office Action, Taiwan Application No. 105140034, dated Sep. 27, 2017, 7 pages.

*Primary Examiner* — Kent W Chang
*Assistant Examiner* — Nathaniel P Brittingham
(74) *Attorney, Agent, or Firm* — Fenwick & West LLP

(57) ABSTRACT

An optical touch-sensitive device includes a planar optical waveguide structure having a planar optical waveguide, and transducers that are able to activate to vibrate a top surface of the planar optical waveguide structure. The device also includes multiple emitters and detectors. The emitters and detectors are arranged along a periphery of the waveguide structure. The emitters produce optical beams that propagate through the waveguide structure via total internal reflection (TIR) to the detectors. Touches on the vibrated top surface of the waveguide structure disturb the optical beams, and the touch-sensitive device determines touch events based on the disturbances.

17 Claims, 17 Drawing Sheets

(56) References Cited

U.S. PATENT DOCUMENTS

| | | | |
|---|---|---|---|
| 2011/0298753 A1* | 12/2011 | Chuang | G06F 3/0421 345/175 |
| 2012/0075217 A1* | 3/2012 | Liu | G06F 3/0421 345/173 |
| 2012/0162113 A1* | 6/2012 | Lee | G08B 6/00 345/173 |
| 2012/0212457 A1 | 8/2012 | Drumm | |
| 2012/0218229 A1* | 8/2012 | Drumm | G06F 3/0421 345/175 |
| 2012/0268403 A1* | 10/2012 | Christiansson | G06F 3/0421 345/173 |
| 2013/0021300 A1* | 1/2013 | Wassvik | G06F 3/0421 345/175 |
| 2013/0021302 A1* | 1/2013 | Drumm | G06F 3/0421 345/175 |
| 2013/0044073 A1* | 2/2013 | Christiansson | G06F 3/0421 345/173 |
| 2013/0093679 A1* | 4/2013 | Dickinson | G06F 3/016 345/168 |
| 2013/0100046 A1* | 4/2013 | Chuang | G06F 3/016 345/173 |
| 2013/0147738 A1* | 6/2013 | Lee | G06F 3/041 345/173 |
| 2013/0318438 A1* | 11/2013 | Afshar | G06F 3/016 715/702 |
| 2014/0028629 A1* | 1/2014 | Drumm | G06F 3/0308 345/175 |
| 2014/0049488 A1* | 2/2014 | Chen | G06F 3/041 345/173 |
| 2014/0098058 A1* | 4/2014 | Baharav | G06F 3/0421 345/174 |
| 2014/0210770 A1* | 7/2014 | Chen | G06F 3/044 345/174 |
| 2014/0218633 A1* | 8/2014 | Lin | G06F 3/0421 349/12 |
| 2014/0268515 A1* | 9/2014 | Smoot | G06F 3/03546 361/679.01 |
| 2014/0306933 A1* | 10/2014 | Lin | G06F 3/042 345/175 |
| 2014/0347322 A1* | 11/2014 | Kamata | G06F 3/016 345/174 |
| 2014/0362034 A1* | 12/2014 | Mo | G06F 3/044 345/174 |
| 2015/0015541 A1* | 1/2015 | Kan | G06F 3/0418 345/175 |
| 2015/0035799 A1* | 2/2015 | Lin | G06F 3/0421 345/175 |
| 2015/0193087 A1* | 7/2015 | Lin | G06F 3/0428 345/175 |
| 2015/0205442 A1* | 7/2015 | Lin | G06F 3/0421 345/175 |
| 2015/0293592 A1* | 10/2015 | Cheong | G06F 3/016 345/173 |
| 2016/0041692 A1* | 2/2016 | Lin | G06F 3/0421 345/175 |
| 2016/0062550 A1* | 3/2016 | Drumm | G06F 3/0421 345/175 |
| 2016/0098152 A1* | 4/2016 | Drumm | G06F 3/0421 345/175 |
| 2016/0170563 A1* | 6/2016 | Drumm | G06F 3/0421 345/175 |
| 2016/0283029 A1* | 9/2016 | Hiratsuka | G06F 3/0416 |
| 2017/0097682 A1* | 4/2017 | Endo | G06F 3/016 |
| 2017/0255337 A1* | 9/2017 | Drumm | G06F 3/0421 |

* cited by examiner

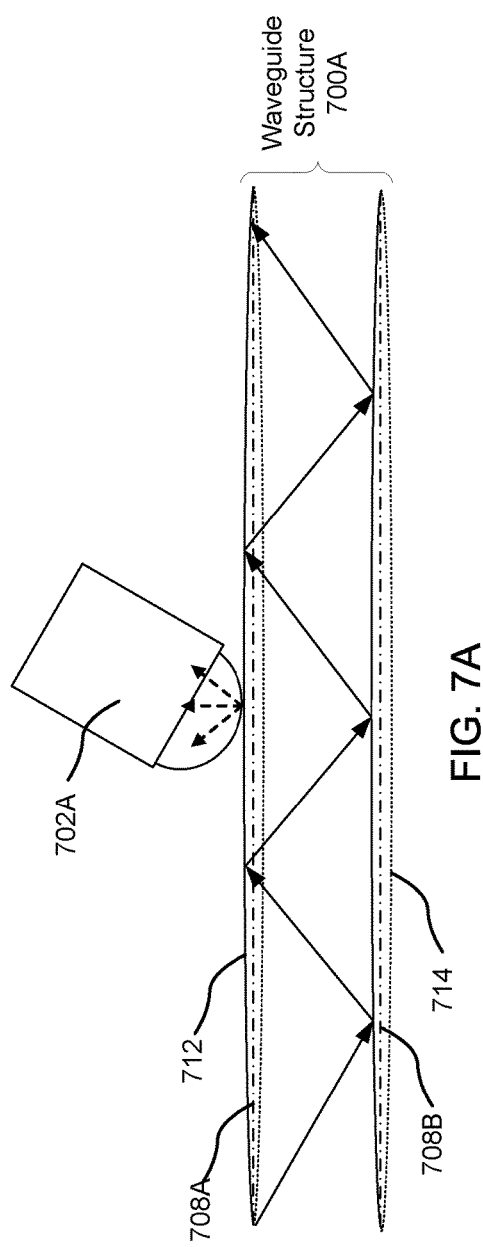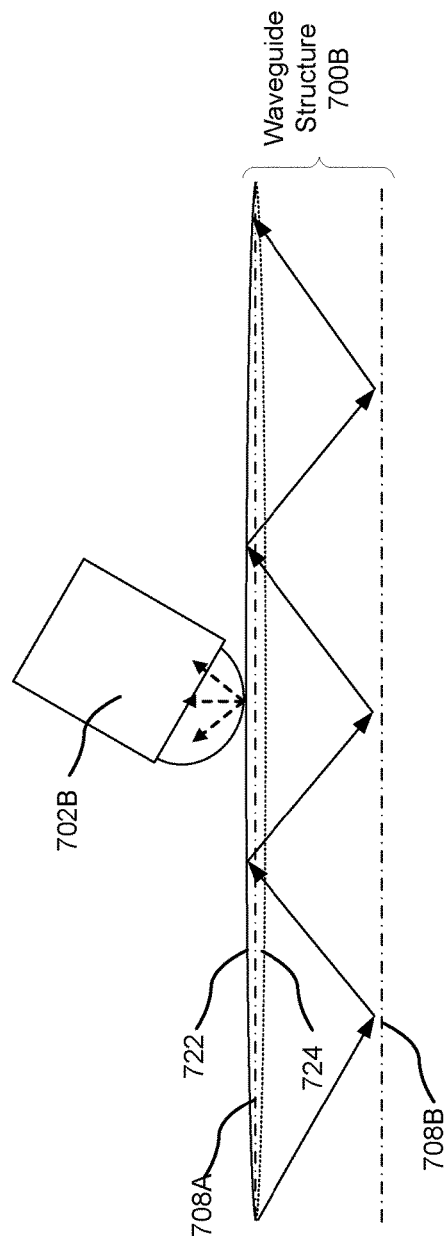

VIBRATED WAVEGUIDE SURFACE FOR OPTICAL TOUCH DETECTION

CROSS REFERENCE TO RELATED APPLICATION(S)

This application claims priority under 35 U.S.C. § 119(e) to U.S. Provisional Patent Application Ser. No. 62/262,321, "Kinetic Friction Reduction—Vibrating the Waveguide," filed Dec. 2, 2015. The subject matter of all of the foregoing is incorporated herein by reference in their entirety.

BACKGROUND

1. Field of Art

This invention generally relates to optical touch detection systems.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of $\delta$; and $\delta w$, respectively. The effective required resolution is then $R=(LW)/(\delta l\ \delta w)$. We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device has a vibrated surface to reduce friction between a contacting object and the surface.

In one aspect, an optical touch-sensitive device includes a planar optical waveguide structure having a planar optical waveguide, and transducers that are able to activate to vibrate a top surface of the planar optical waveguide structure. The device also includes multiple emitters and detectors. The emitters and detectors are arranged along a periphery of the waveguide structure. The emitters produce optical beams that propagate through the waveguide structure via total internal reflection (TIR) to the detectors. Touches on the vibrated top surface of the waveguide structure disturb the optical beams, and the touch-sensitive device determines touch events based on the disturbances.

In another aspect, the optical touch-sensitive device determines a touch type for a touch event by an object on the optical waveguide structure. The optical touch-sensitive device activates the emitters and detectors in a controlled manner for multiple scans, and each scan is associated with a set of scanning characteristics. The optical touch-sensitive device activates at least one transducer to vibrate a top surface of the optical waveguide structure, and the vibration of the top surface is associated with a set of vibration characteristics. The optical touch-sensitive device measures the optical beams to determine which optical beams have been disturbed by the touch event for each of the scans. The optical touch-sensitive device analyzes together the measured optical beams of the scans based on the vibration characteristics and the scanning characteristics. The optical touch-sensitive device determines the touch type of the touch event based on the analysis.

Other aspects include components, devices, systems, improvements, methods, processes, applications, computer readable mediums, and other technologies related to any of the above.

BRIEF DESCRIPTION OF DRAWINGS

Embodiments of the present invention will now be described, by way of example, with reference to the accompanying drawings, in which:

FIG. 7A is a cross sectional diagram of a waveguide structure experiencing a mechanical transverse vibration, according to one embodiment.

FIG. 7B is a cross sectional diagram of the top surface of a waveguide structure experiencing a mechanical transverse vibration, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

This detailed description is divided into two parts. Part A provides a description of various aspects of touch-sensitive systems and the detection of multi-touch events. These are described primarily in the context of finger touches, but the concepts apply also to instrument (e.g., pen or stylus) touches. Part B provides a description of detecting touch events and touch types, based in part on a vibrated waveguide. The following is the contents of the detailed description:

Part A: Touch Detection

I. Introduction

A. Device Overview

Figure 1:
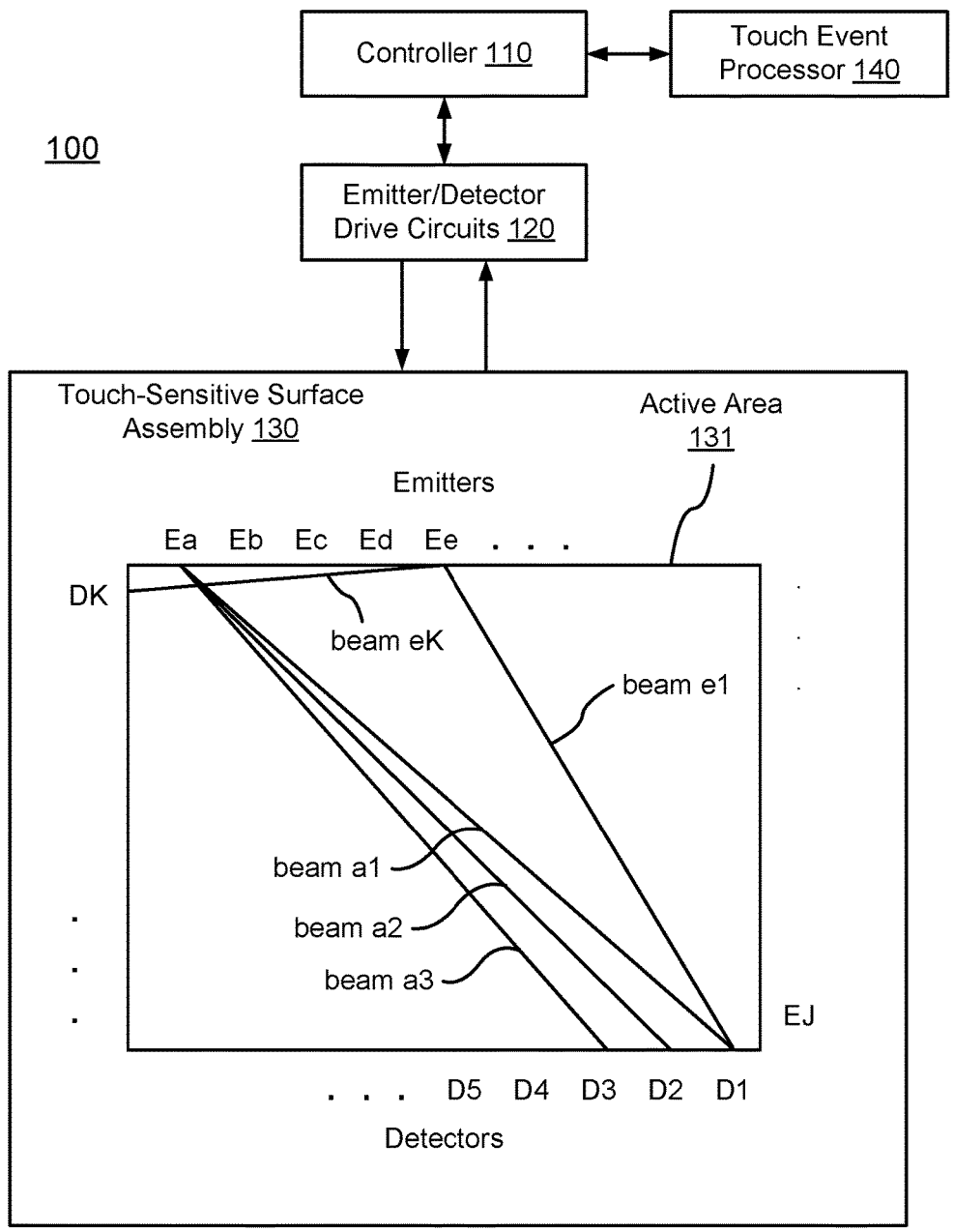
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area 131 may sometimes be referred to as the active area or active surface, even though the active area itself may be an entirely passive structure such as an optical waveguide. The assembly 130 also includes emitters and detectors arranged along the periphery of the active area 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

These touch-sensitive devices can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler zone phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

B. Process Overview

Figure 2:
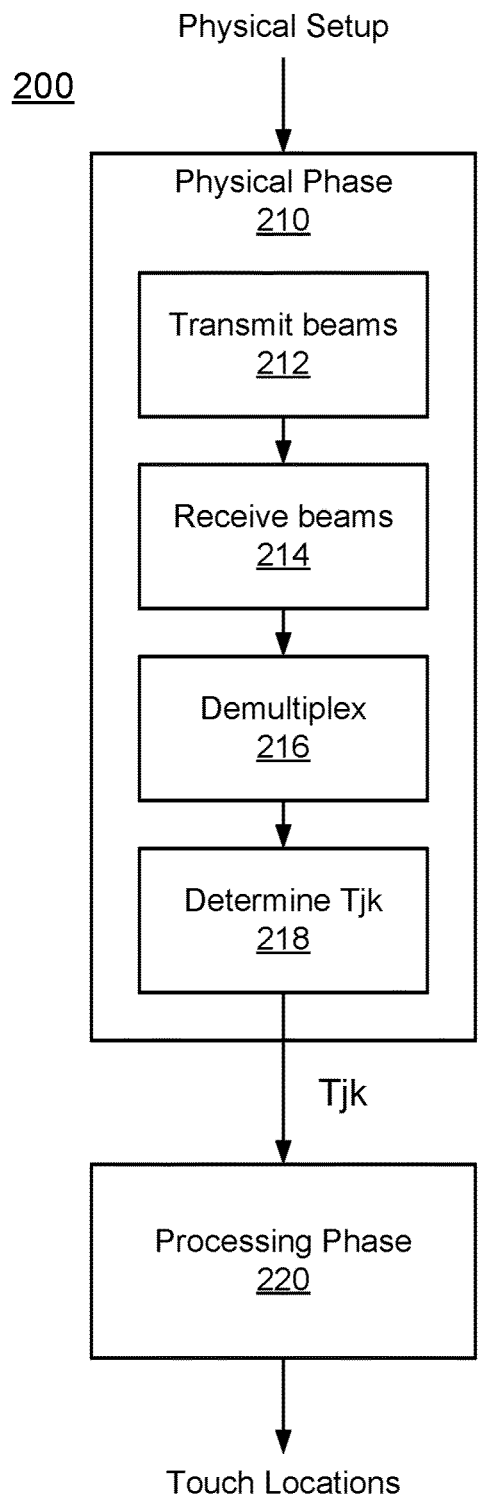
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required. Also note that the Tjk may have a temporal aspect.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

B. Touch Interactions

Figure 3A:
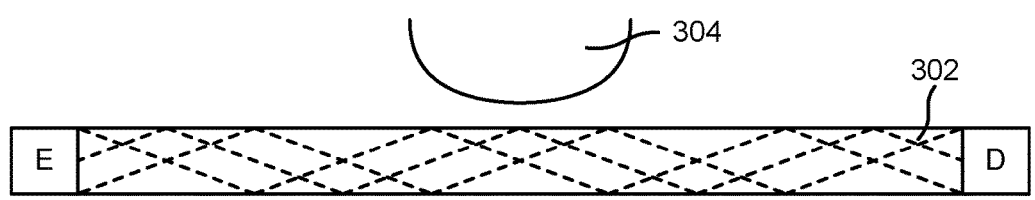
FIGS. 3A-3B illustrate a frustrated TIR mechanism for a touch interaction with an optical beam, according to one embodiment.
Figure 3B:
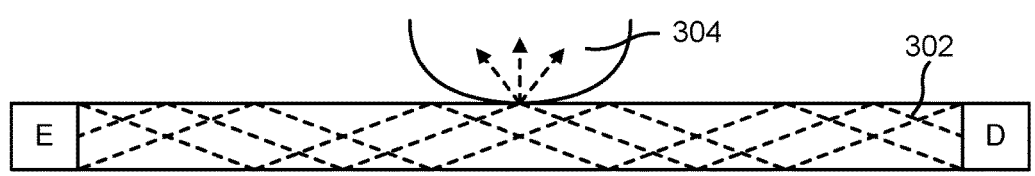

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam, according to one embodiment. In FIG. 3A, the optical beam, shown as a dashed line, travels from emitter E to detector D through an optically transparent planar waveguide 302. The beam is confined to the waveguide 302 by total internal reflection. The waveguide may be constructed of plastic or glass, for example. In FIG. 3B, an object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3C:
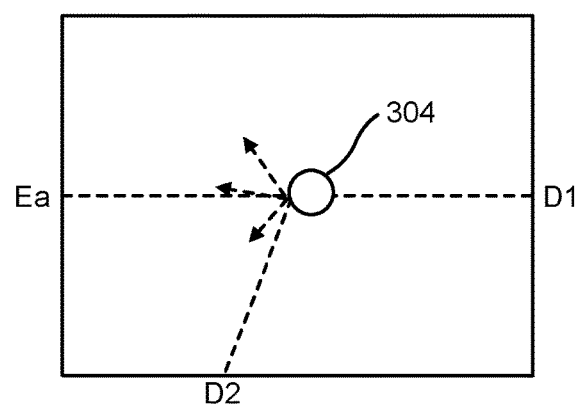
FIG. 3C illustrates a touch interaction with an optical beam enhancing transmission, according to one embodiment.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission, according to one embodiment. FIG. 3C is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of the optical beams can be external or internal. Examples of sensor elements for the detector include charge coupled devices, photodiodes, photoresistors, phototransistors, and nonlinear all-optical detectors.

The emitters and detectors may also include optics and/or electronics in addition to the main optical source, sensor element. For example, emitters and detectors may incorporate or be attached to lenses to spread and/or collimate emitted or incident light. Additionally, one or more optical coupling assemblies (couplers) of varying design can be used to couple the emitters and detectors to the waveguide.

The waveguide, coupler, and any intervening optical elements all have a similar refractive index that is higher than that of air to facilitate TIR throughout the entire optical path of each beam. These elements may be physically coupled together using a bonding agent that has a similar refractive index to the waveguide and coupler. Alternatively, at various points along the optical path air gaps may be present between elements in place of a bonding agent.

D. Optical Beam Paths

Figure 4A:
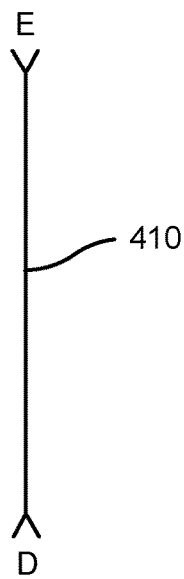
FIGS. 4A-4C are top views of differently shaped beam footprints, according to one embodiment.
Figure 4B:
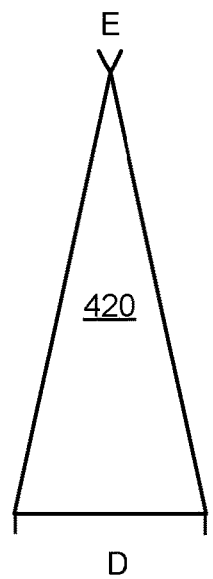
Figure 4C:
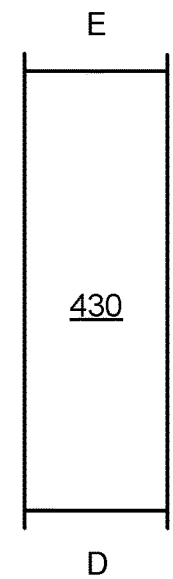

Another aspect of a touch-sensitive system is the shape and location of the optical beams and beam paths. In FIG. 1, the optical beams are shown as lines. These lines should be interpreted as representative of the beams, but the beams themselves may be different shapes and footprints. FIGS. 4A-4C are top views of differently shaped beam footprints, according to one embodiment. In FIG. 4A, a point emitter and point detector produce a narrow "pencil" beam with a line-like footprint. In FIG. 4B, a point emitter and wide detector (or vice versa) produces a fan-shaped beam with a triangular footprint. In FIG. 4C, a wide emitter and wide detector produces a "rectangular" beam with a rectangular footprint of fairly constant width. Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully blocked or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

The direction and spread of the light emitted from the emitters and received by the detectors may vary in spread or angle from beam footprints intended to cover the active area 131. To shape the beams to achieve the intended footprints, lenses may be attached to the emitters and detectors. For example, point emitters and detectors may be used in conjunction with lenses to spread beams in the horizontal or vertical directions.

Figure 5A:
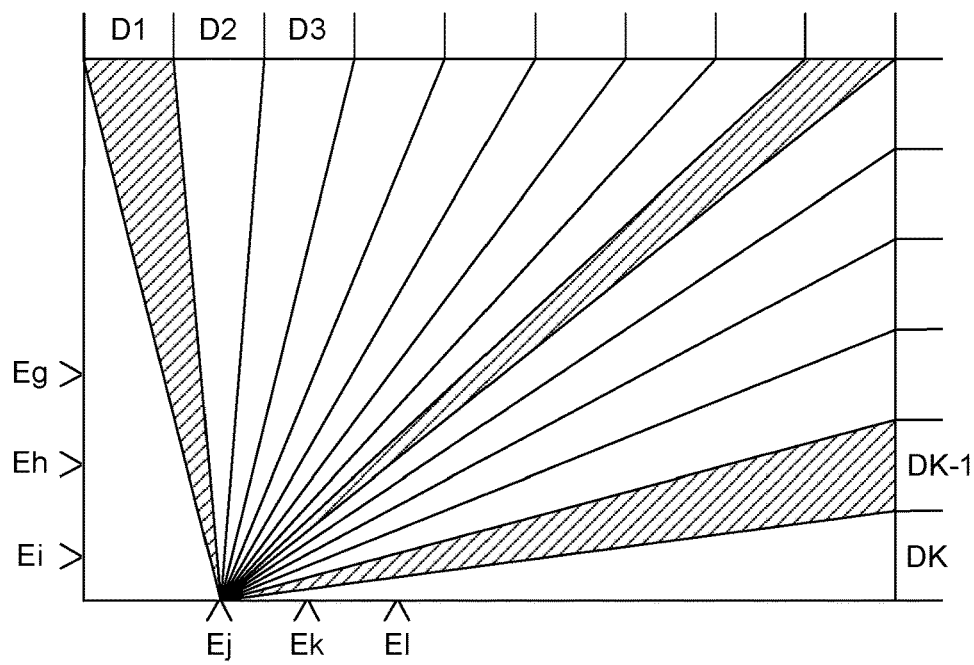
FIGS. 5A-5B are top views illustrating active area coverage by emitters and detectors, according to one embodiment.
Figure 5B:
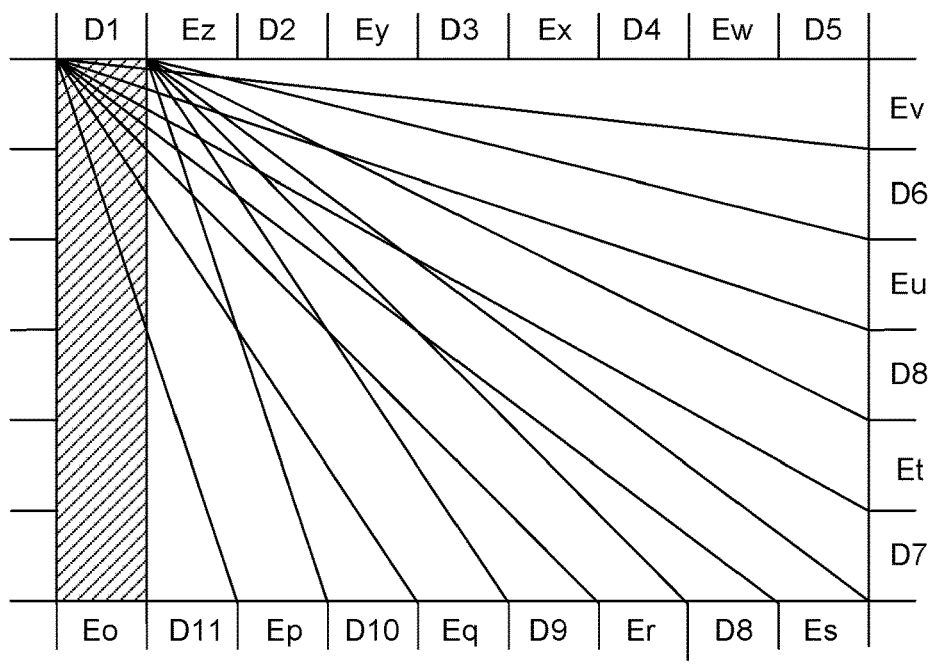

FIGS. 5A-5B are top views illustrating active area coverage by emitters and detectors, according to one embodiment. As above, the emitters and detectors are arranged along the periphery of the active area. All the emitters may be arranged on two sides of the active area, for example two adjacent perpendicular sides as illustrated in FIG. 5A. Similarly, all of detectors may be arranged on the other two sides of the active area. Alternatively, the emitters and detectors may be mixed or interleaved according to a pattern as illustrated in FIG. 5B. This pattern may be one emitter in between each detector, or another more complicated arrangement.

In most implementations, each emitter and each detector will support multiple beam paths, although there may not be a beam from each emitter to every detector. The aggregate of the footprints from all beams from one emitter (or to one detector) will be referred to as that emitter's (detector's) coverage area. The coverage areas for all emitters (or detectors) can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The overall coverage area for all emitters should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

The concepts described above for emitters also apply to detectors. A detector's coverage area is the aggregate of all footprints for beams received by the detector.

E. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation. Examples of multiplexing include code division multiplexing, frequency division multiplexing, time division multiplexing. Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams. Several multiplexing techniques may also be used together.

Figure 6:
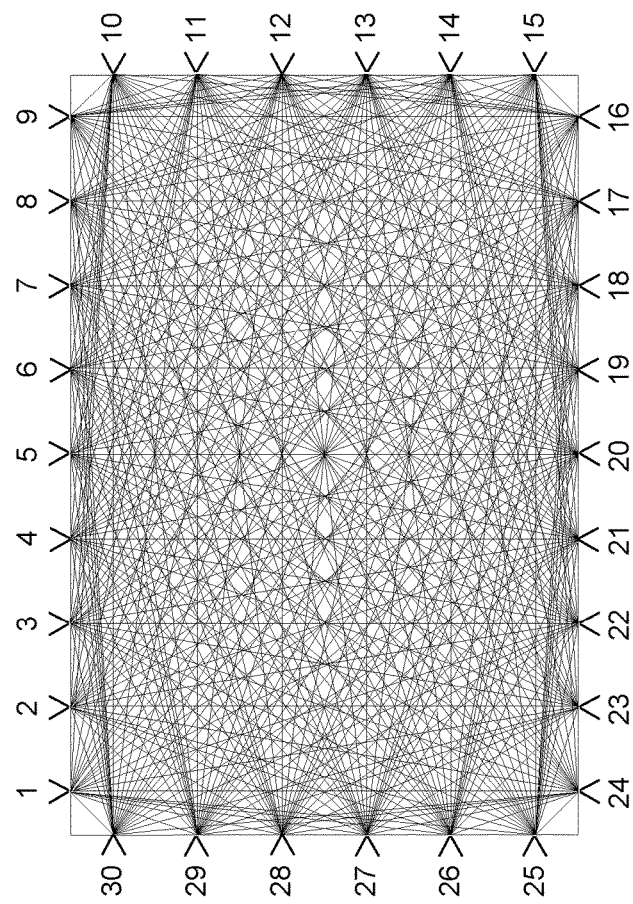
FIG. 6 is a top view that shows all of the optical beams for all possible pairs of emitter and detector, according to one embodiment.

FIG. 6 is a top view of an example device that shows all of the optical beams for all possible pairs of emitter and detector, according to one embodiment. As shown in FIG. 6, the emitters and detectors are arranged around the periphery of the active area at the location numbered 1-30. In this example, beam terminals are not labeled as emitter or detector. Assume that there are sufficient emitters and detectors to realize any of the possible beam paths.

III. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. patent application Ser. No. 13/059,817, "Method and Apparatus for Detecting a Multitouch Event in an Optical Touch-Sensitive Device," which is incorporated herein by reference.

B. Line Imaging, Tomography

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location. These line images can be processed to reconstruct the touch points, for example by using correlation or tomography principles. This approach is described in further detail in U.S. patent application Ser. No. 13/460,703, "Detecting Multitouch Events in an Optical Touch-Sensitive Device using Touch Event Templates," and Ser. No. 14/092,850, "Optical Touch Tomography," which are incorporated herein by reference.

C. Location Interpolation

Applications typically will require a certain level of accuracy in locating touch points. One approach to increase accuracy is to increase the density of emitters, detectors and beam paths so that a small change in the location of the touch point will interrupt different beams. Another approach is to interpolate between beams. This approach is described in further detail in U.S. patent application Ser. No. 13/460,703, "Detecting Multitouch Events in an Optical Touch-Sensitive Device using Touch Event Templates," which is incorporated herein by reference.

D. Touch Event Templates

If the locations and shapes of the beam paths are known, which is typically the case for systems with fixed emitters, detectors and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements.

Thus, in another approach, the set of templates is simplified. For example, one possible template for a touch event with a certain contact area is the set of all beam paths that would be affected by the touch. However, this is a large number of beam paths, so template matching will be more difficult. In addition, this template is very specific to contact area. If the contact area changes slightly in size, shape or position, the template for contact area will no longer match exactly. Also, if additional touches are present elsewhere in the active area, the template will not match the detected data well. Thus, although using all possible beam paths can produce a fairly discriminating template, it can also be computationally intensive to implement. An alternative uses templates with less than all affected beams. For example, a simpler template may be based on only four beams that would be interrupted by a certain contact area. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for a certain contact area, increasing in the number of beams contained in the template: a 2-beam template, a 4-beam template, etc. In one embodiment, the beams that are interrupted by contact area are ordered sequentially from 1 to N. An n-beam template can then be constructed by selecting the first n beams in the order. Generally speaking, beams that are spatially or angularly diverse tend to yield better templates. That is, a template with three beams running at 60 degrees to each other and not intersecting at a common point tends to produce a more robust template than one based on three largely parallel beams which are in close proximity to each other. In addition, more beams tend to increase the effective signal-to-noise ratio of the template matching, particularly if the beams are from different emitters and detectors.

Often, a base template can also be used to generate a family of similar templates. For example, contact area B may be is the same as contact area A, but shifted to the right. The corresponding four-beam template for contact area B can then be generated from the template for contact area A, by making use of the right shift. More generally, the template for contact area A can be abstracted or parameterized (e.g., where the parameters are the amount of shift in different directions). The abstraction will be referred to as a template model. In one approach, the model is used to generate the individual templates and the actual data is matched against each of the individual templates. In another approach, the data is matched against the template model. The matching process then includes determining whether there is a match against the template model and, if so, which value of the parameters produces the match.

Templates can use both positive and negative regions. An actual contact area may be surrounded by a "touch-free" zone. If contact is made in the actual contact area, then there will be no contact in the immediately surrounding area. Thus, the template includes both (a) beams in the contact area that are interrupted, and (b) beams in the shaded area that are not interrupted.

Templates can also be based both on reduced and enhanced transmission coefficients. For a particular type of contact, the transmission coefficients for certain beams that are interrupted should decrease. However, the touch interaction may scatter or reflect light in other directions, and the transmission coefficients for these directions should increase.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

Additional examples of touch event templates are described in further detail in U.S. patent application Ser. No. 13/460,703, "Detecting Multitouch Events in an Optical Touch-Sensitive Device using Touch Event Templates," which is incorporated herein by reference.

E. Multi-Pass Processing

Referring to FIG. 2, the processing phase need not be a single-pass process nor is it limited to a single technique. Multiple processing techniques may be combined or otherwise used together to determine the locations of touch events.

As one example, a first stage is a coarse pass that relies on a fast binary template matching. In this stage, the templates are binary and the transmittances T'jk are also assumed to be binary. The binary transmittances T'jk can be generated from the analog values Tjk by rounding or thresholding the analog values. The binary values T'jk are matched against binary templates to produce a preliminary list of candidate touch points. Some clean-up is performed to refine this list. For example, it may be simple to eliminate redundant candidate touch points or to combine candidate touch points that are close or similar to each other. A second stage is used to eliminate false positives, using a more refined approach. For each candidate touch point, neighboring beams may be used to validate or eliminate the candidate as an actual touch point. The techniques described in U.S. patent application Ser. No. 13/059,817 may be used for this purpose. This stage may also use the analog values Tjk, in addition to accounting for the actual width of the optical beams. The output of stage is a list of confirmed touch points. The final stage refines the location of each touch point. For example, the interpolation techniques described previously can be used to determine the locations with better accuracy. Since the approximate location is already known, stage may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower nominal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

Part B: Vibrated Waveguide

IV. Vibrated Waveguide Structure

A. Vibration Characteristics

The active area of the optical touch-sensitive device 100 includes an optical waveguide structure. The waveguide structure may be rigid or flexible. The top surface of the waveguide structure or the entire waveguide structure vibrates when the emitters and detectors are activated to detect one or more touch events. In some embodiments, the top surface is a touch sensitive surface of a planar optical waveguide. Alternatively, the top surface may be a vibration layer on top of, and which does not interfere with, a touch sensitive planar optical waveguide, as further described in Section IV.B. For example, the waveguide structure may vibrate when a user's finger moves across the optical touch-sensitive surface, or when a user moves a stylus across the surface. Vibration characteristics characterize the vibrated waveguide structure. Examples of vibration characteristics include vibration period, vibration frequency, vibration phase, vibration to scan phase shift, vibration amplitude, and vibration orientation. Vibration period refers to a duration of time for a waveguide structure to make a complete vibration cycle. A complete vibration cycle is defined as the waveguide structure moves from its neutral position to one extreme position, and moves back to the neutral position, and then moves to the other extreme position, and moves back to the neutral position. Vibration frequency refers to the number of times the complete vibration cycle repeats in a given time period. Vibration phase is an instant time position of the waveguide structure during a vibration cycle. Vibration to scan phase shift is a difference in vibration phase within a period of vibration of the waveguide top surface between two sequential scans of a given beam. This quantity may vary depending upon which beam is being considered, as different emitters and detectors may be active at different times. For example, more than one emitter may be active at a time point, or more than one detector may be active at a time point. Vibration amplitude refers to a distance from the neutral position to the extreme position on either side. Vibration orientation refers to movement orientation of the waveguide. The waveguide structure may vibrate up and down. This type of vibration refers to mechanical transverse vibration. Additionally or alternatively, the waveguide structure may move back and forth. This type of vibration refers to mechanical longitudinal vibration.

FIG. 7A is a cross sectional diagram of an entire waveguide structure 700A experiencing a mechanical transverse vibration, according to one embodiment. The neutral position of the waveguide structure 700A is represented by dash-dotted lines 708. When the entire waveguide structure 700A vibrates, the waveguide structure 700 moves up from the neutral position 708 to a first extreme position 712 (also referred to as vibration peak). The waveguide structure 700A returns to the neutral position 708 from the vibration peak 712, and continues moving down from the neutral position 708 to a second extreme position 714 (also referred to as vibration trough). The waveguide structure 700A returns to the neutral position 708 from the vibration trough 714. This series of movements of the waveguide structure 700A forms a complete vibration cycle. The series of movements can be characterized by vibration characteristics (e.g., vibration period, frequency, phase, amplitude and orientation). Assume that this vibration cycle corresponds to a first vibration phase A. If the first vibration phase A is shifted to a second vibration phase A+180°, the waveguide structure 700A moves down from the neutral position 708 to the vibration trough 714 first, and returns to the neutral position 708, and continues moving up to the vibration peak 712, and returns to the neutral position 708.

By adjusting vibration characteristics, vibrated waveguide structure can be designed in various ways. When an object 702A (a stylus or a finger) moves across the vibrated waveguide structure 700A, the object 702A requires less force to move along the surface because the vibration causes both kinetic friction and static friction experienced by the object 702A to be reduced. When the object 702A is in contact with the vibrated waveguide structure (e.g., vibration peak 712), the object 702B disturbs the total internal reflection of the beam within the waveguide structure 700A. The disruption of total internal reflection increases the light leakage from the waveguide structure 700A, attenuating any beams passing through the contact area. Correspondingly, removal of the object 702A will stop the attenuation of the beams passing through.

FIG. 7B is a cross sectional diagram of the top surface of the waveguide structure 700B experiencing a mechanical transverse vibration, according to one embodiment. In this example, the top surface of the waveguide structure may move up to a vibration peak 722, or may move down to a vibration trough 724. Several technologies may be used to produce surface vibration. For example, surface acoustic waves (e.g., Rayleigh waves) are sound waves that travel parallel to the top surface of the waveguide, with their displacement amplitude decaying into the top surface of the waveguide structure to vibrate the top surface.

B. Multi-Part Vibrated Waveguide Structure

In some embodiments, the waveguide structure is constructed from multiple parts. In one approach, the waveguide structure includes a planar waveguide having a flat, vibrationless top surface (i.e., flat, parallel top and bottom surfaces), with vibration layer on the top surface of the planar waveguide. The vibration layer may be rigid or flexible. The vibration layer has an index of refraction that supports total internal reflection of the sensing light at the layer surface. Instead of vibrating a top surface or the whole waveguide structure 700A in FIG. 7A, only the vibration layer is vibrated to produce mechanical transverse vibration or mechanical longitudinal vibration. The vibration layer may be manufactured separately and then affixed to the flat, vibrationless top surface of the waveguide structure. The vibration layer may be transparent. For example, a piece of glass may be applied as a solid transparent layer to the planar waveguide.

Figure 7C:
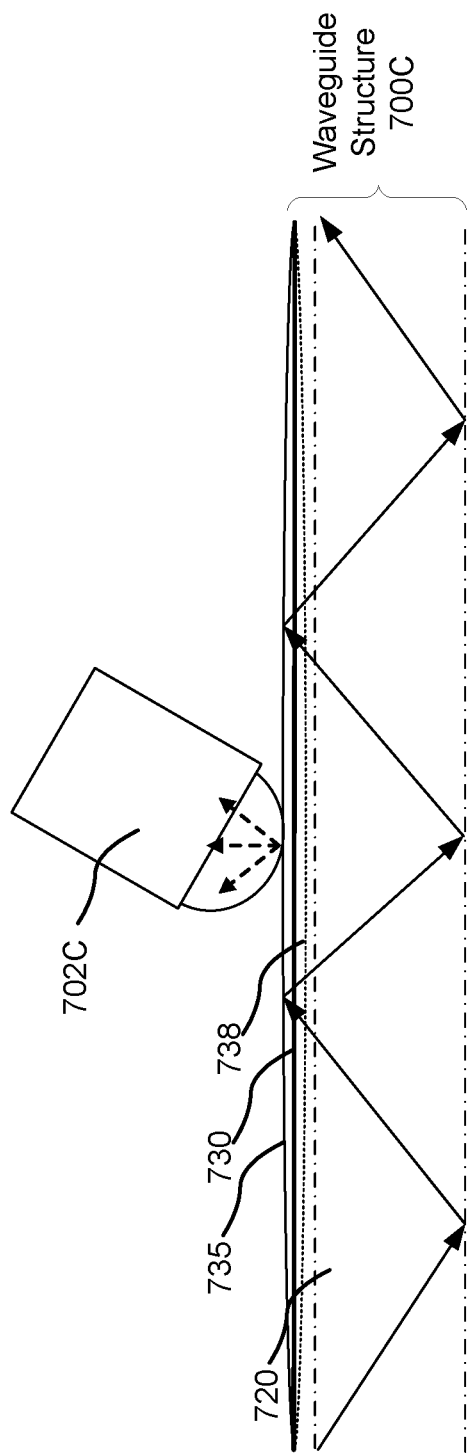
FIG. 7C is a cross sectional diagram of a multi-part waveguide structure experiencing a mechanical transverse vibration, according to one embodiment.

FIG. 7C is a cross sectional diagram of a multi-part waveguide structure 700C experiencing a mechanical transverse vibration. The multi-part waveguide structure 700B includes a planar waveguide 720 having a flat, vibrationless top surface and also includes vibration layer 730. In the example of FIG. 7C, the vibration layer 730 placed on the top of the planar waveguide 720 can move up to a vibration peak 735, or can move down to a vibration trough 738. The vibration of the vibration layer 730 is characterized by vibration characteristics. Due to an optical coupling between the planar waveguide 720 and the vibration layer 730, the object 702B disturbs the total internal reflection of the beam within the planar waveguide 720.

C. Transducers

Transducers control mechanical vibration of the waveguide structure in a specific manner. For example, transducers control the waveguide structure to vibrate with predefined vibration characteristics. The transducers are generally electromechanical transducers (e.g., electrostatic transducers, electromagnetic transducers, specific examples of which would be piezoelectric transducers and surface acoustic wave transducers).

The vibration of the waveguide structure may be spatially localized or may be across the entire waveguide structure, and a given touch sensitive device may be constructed to perform either type of vibration. Accordingly, there are a number of regions of interest where it may be advantageous to place transducers to vibrate the waveguide structure to perform either or both kinds of vibration. In various embodiments, transducers may be placed on various locations of the touch-sensitive surface assembly. For example, the transducers may be located proximal to an edge of the waveguide structure, underneath the waveguide structure, on top of the waveguide structure, or some combination thereof.

Figure 8A:
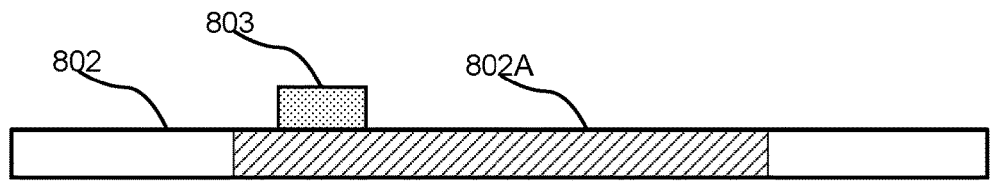
FIG. 8A is a side view of locations to place transducers on top of a waveguide structure having an area associated with a display, according to one embodiment.
Figure 8B:
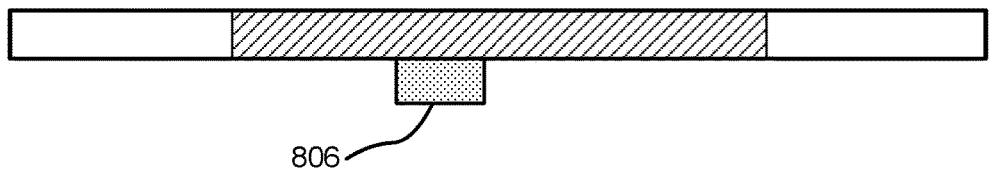
FIG. 8B is a side view of locations to place transducers underneath a waveguide structure having an area associated with a display, according to one embodiment.
Figure 8C:
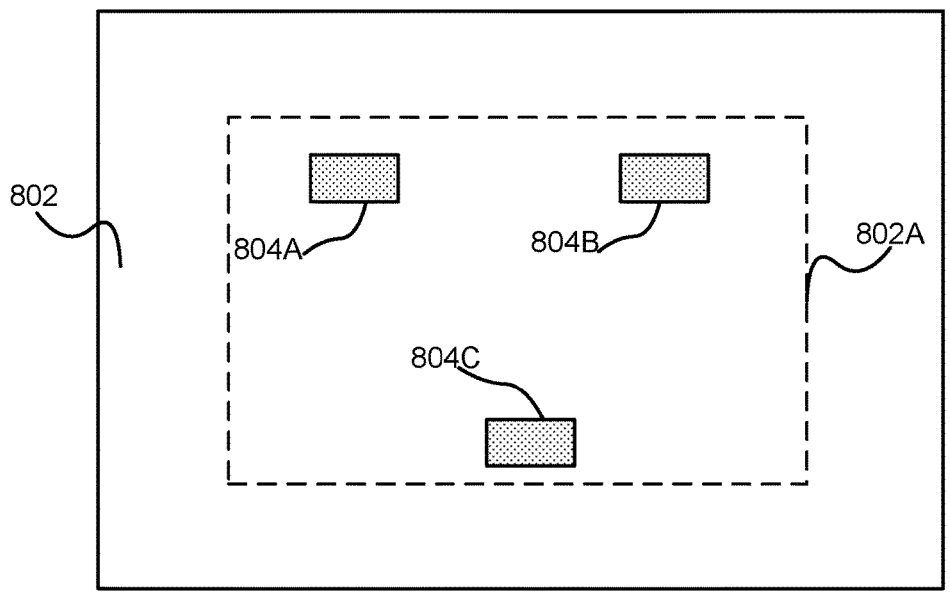
FIG. 8C is a top view of locations to place transducers on top of a waveguide structure, according to one embodiment.
Figure 8D:
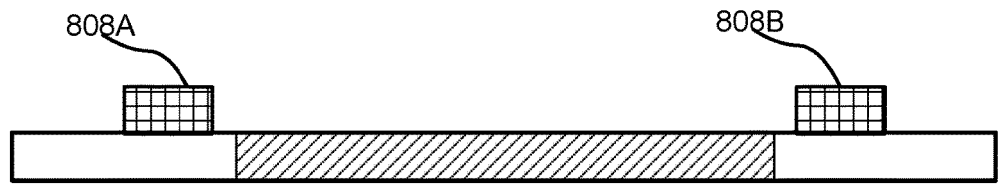
FIG. 8D is a side view of locations to place transducers on top of a waveguide structure having an area associated with a display, according to another embodiment.
Figure 8E:
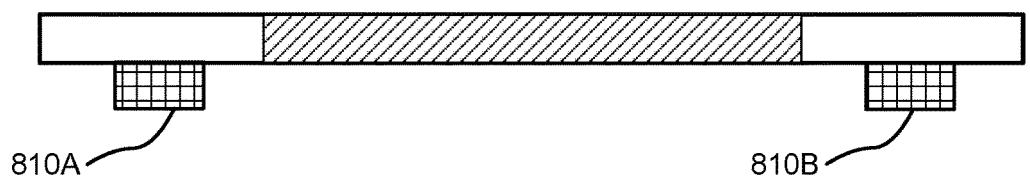
FIG. 8E is a side view of locations to place transducers underneath a waveguide structure having an area associated with a display, according to another embodiment.
Figure 8F:
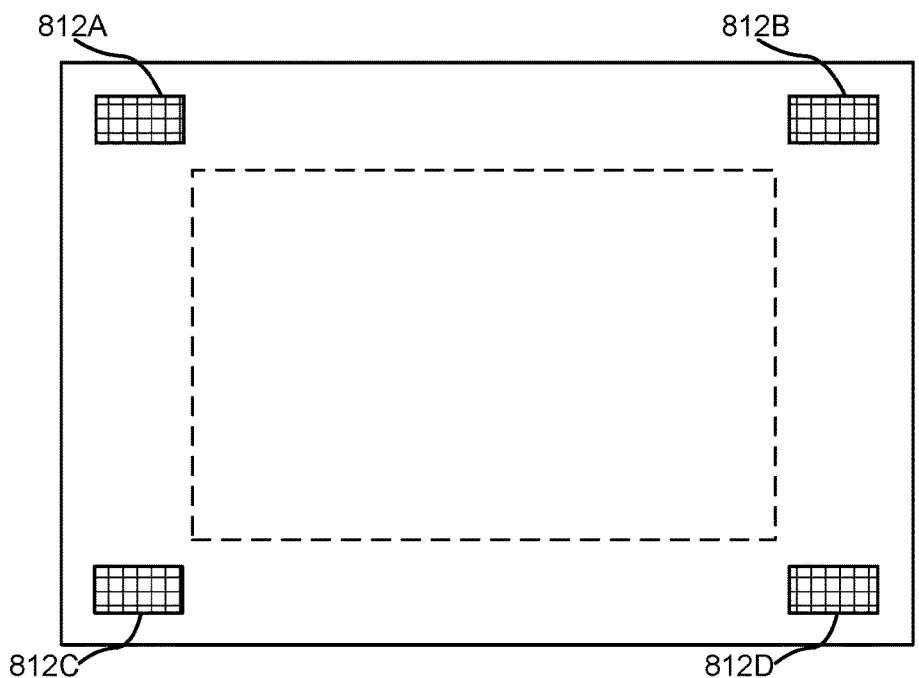
FIG. 8F is a top view of locations to place transducers on a waveguide structure, according to another embodiment.

FIGS. 8A-8H show examples of locations to place the transducers. FIGS. 8A, 8B, 8D, 8E are side views of locations to place transducers on a waveguide structure 802 having an area 802A associated with a display. FIG. 8C and FIG. 8F are top views of locations to place transducers on the waveguide structure 802. In some embodiments, a display module (not shown in FIG. 8) may be located underneath the area 802A of the waveguide structure 802 so that the display module is able to display images that are visible through the waveguide structure by a user. In addition to the locations listed in the prior paragraph, the transducers may additionally or alternatively be positioned in relation to the display module, for example proximal to an edge of a display, underneath the display, on top of the display, or some combination thereof.

FIG. 8A shows a transducer 803 is placed on top of the area 802A. FIG. 8B shows a transducer 806 is underneath the area 802A of the waveguide 802. FIG. 8D shows transducers 808 are placed proximal to edges of the waveguide structure 802 and on top of the waveguide structure 802, but leaving the area 802A clear. FIG. 8D shows transducers 810 are placed proximal to edges of the waveguide structure 802 and underneath the waveguide structure 802, but leaving the area 802A clear. Multiple transducers can be placed on the top of the waveguide structure 802 or underneath the waveguide structure 802. FIG. 8C shows multiple transducers 804A-804C are placed proximal to edges of the area 802A. FIG. 8F shows multiple transducers 812A-812D are placed proximal to edges of the waveguide structure 802.

Figure 8G:
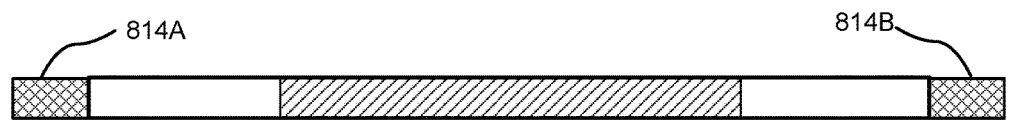
FIG. 8G is a side view of locations to place transducers adjacent to a waveguide structure, according to one embodiment.
Figure 8H:
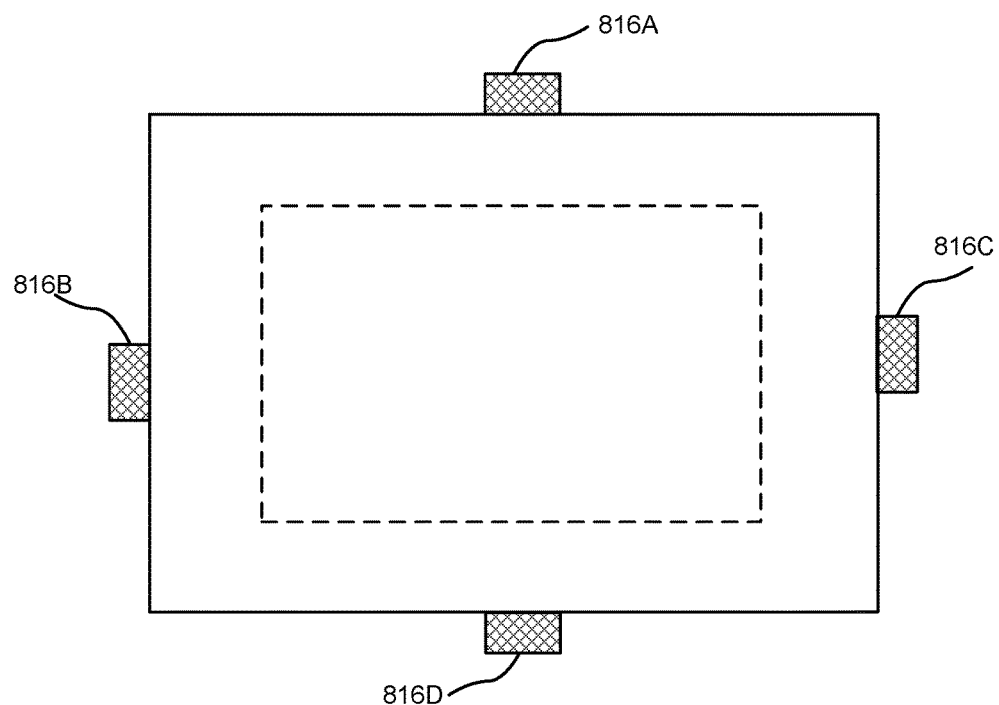
FIG. 8H is a top view of locations to place transducers adjacent to a waveguide structure, according to one embodiment.

In some embodiments, the transducers can be placed adjacent to the waveguide structure 802. FIG. 8G and FIG. 8H are a side view and a top view of locations to place transducers adjacent to the waveguide structure 802, respectively. FIG. 8G and FIG. 8H show multiple transducers are attached to edges of the waveguide structure 802.

In addition to the above possible locations of the transducers, the transducers may also be arranged relative to each other so as to form a patterned layout. For example, they may be spaced in a pattern on top of or below waveguide, spaced in a pattern around the outer edge of the waveguide or display or adjacent to the edge of the waveguide, and so on. The pattern may be evenly spaced, or more irregular. Transducer layout also does not have to follow a pattern, for example one or more transducers may be located at particular points below the waveguide surface where localized vibrations are desired to be produced, for example to provide haptic feedback to the user.

The transducers may be driven by individually devised signals which will result in a localized vibration at a place on the surface of waveguide structure. In such way, the transducers may be controlled to allow for any particular vibration to be induced at any point on the surface of the waveguide structure. For example, this may be done to locally reduce the friction for touches in that location. As a simple example, a circular array of transducers driven with the same signal will give rise to a maximum amplitude of vibration locally in the center of the circle. This is because the vibrations will all be in-phase at that location, having travelled an equal distance from all of the transducers. In a more sophisticated implementation, the phase of the driving signals may be controlled based on real-time reflections of the vibrations off the edges of the waveguide and real-time vibration from the transducers at mounting points. In such way, the location of a vibration maximum may be controlled in real time.

V. Vibration Disturbance Minimization

Touch events on the top surface of the waveguide structure are detected by frustrated TIR. That is, the evanescent wave from TIR in the waveguide structure is disrupted by a contacting object. This frustrated TIR can occur even when the contacting object is slightly separated from the waveguide structure, but increasing the separation will reduce the effect. When the waveguide structure vibrates during a touch event, the vibration may separate the waveguide structure from the contacting object. If the separation is small enough that the contacting object is still within the evanescent field, the contacting object will still disturb the optical beam propagating the waveguide structure creating the desired TIR effect. If the separation is large enough that the contacting object exceeds the evanescent field, the object will show little or no effect on the optical beams. This is referred to as vibration disturbance. To reduce vibration disturbance, vibration (vibration characteristics) and optical scanning (scanning characteristics) can be synchronized in various ways. As will be explained in the following sections, the vibration and optical scanning may, for example, be fully synchronized or fractionally synchronized.

A. Optical Scanning

As mentioned above, emitters transmit optical beams to detectors. In some embodiments, all possible optical beams are activated simultaneously. This may occur if all emitters are continuously on, with detectors sampling the received light. Alternately, emitters may transmit pulses of a finite duration, but with all emitters transmitting their pulses at the same time. In some embodiments, not all optical beams need be transmitted at the same time. This may occur if the emitters are activated sequentially and the relevant detectors are all active simultaneously for each emitter activation time.

Figure 9A:
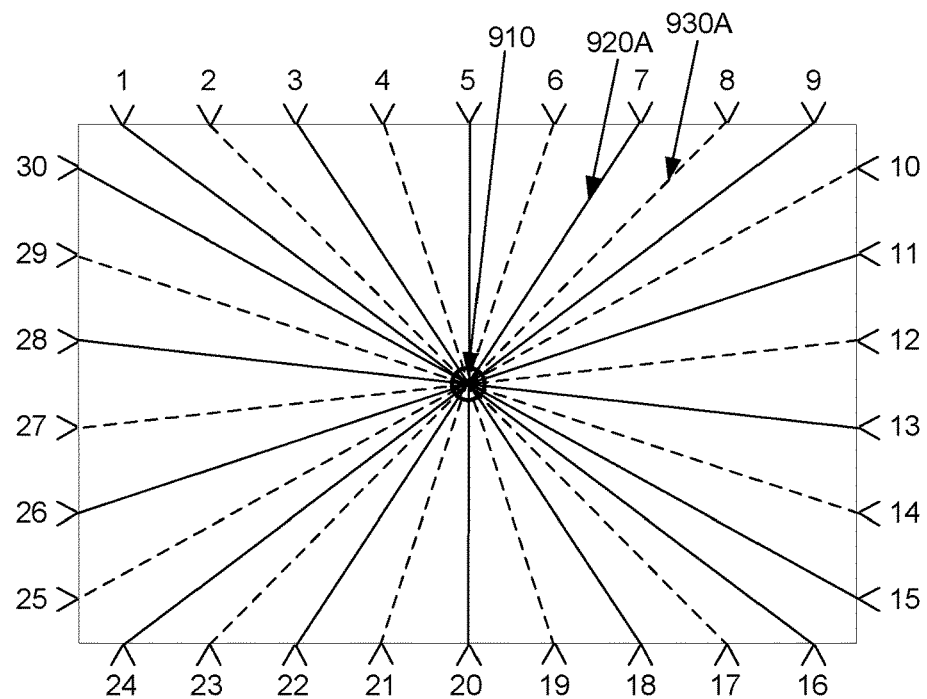
FIG. 9A is a top view illustrating optical beams disturbed by vibration of the waveguide structure, according to one embodiment.
Figure 9B:
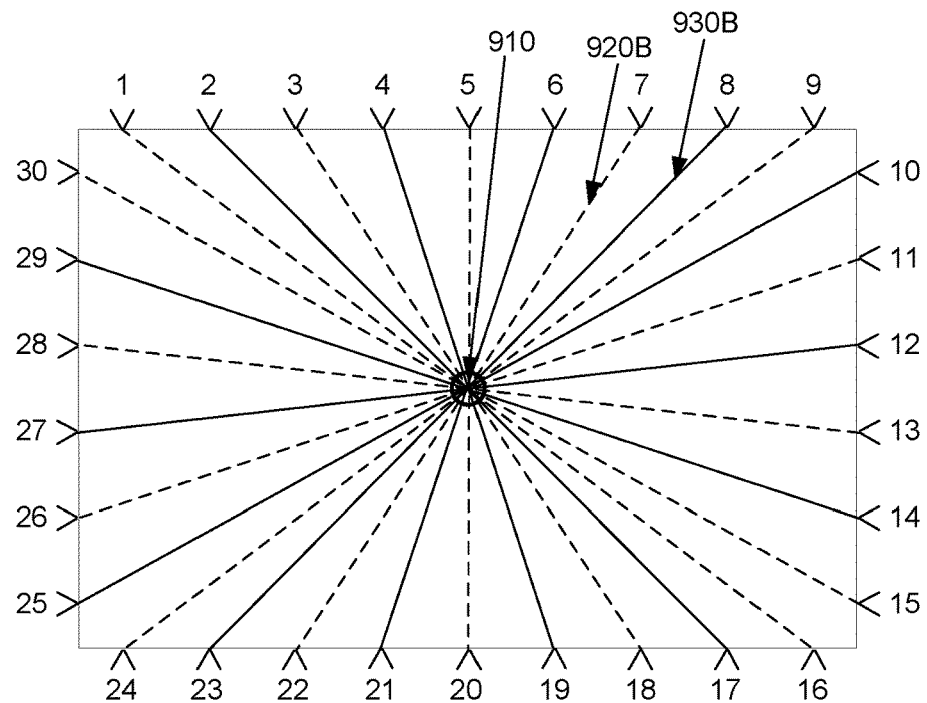
FIG. 9B is a top view illustrating optical beams disturbed by applying a 180-degree phase shift to the vibration of the waveguide structure illustrated in FIG. 9A, according to one embodiment.

For purposes of the following description, the situation where each applicable optical beam has been transmitted once will be referred to as a scan, and the rate at which this occurs will be referred to as the scan rate or refresh rate. In the case of continuously transmitting emitters, the scan rate is set by the detector sampling rate. In the case of emitted pulses, the scan rate is set by the rate of pulse transmission or the detector sampling rate. In the case of sequentially transmitting emitters, the scan rate is set by emitter activation time or the detector sampling rate. FIGS. 9A and 9B show a time sequence where emitters are activated sequentially. In this example, beam terminals 1-30 can be emitters or detectors. The emitters are activated in numerical order from 1-30 and the relevant detectors are all active simultaneously for each emitter activation. Emitter 1 is activated and produces optical beams received by detectors 10-30. Emitter 2 is then activated and so on through emitter 30. As an example, assume that each emitter activation time is 30 microseconds (μs), then time for one scan is 30 μs×30=900 μs, and a scan rate is 1/(900 μs)=0.001111 (or 1111 Hertz (Hz)).

Scanning characteristics characterize optical scanning. Examples of the scanning characteristics include scan rate, the number of emitters, the number of detectors, emitter activation time, detector activation time, detector sampling rate, or rate of pulse transmission. One or both of the vibration characteristics and the scanning characteristics may also include vibration to scan phase shift, as introduce above in the section describing vibration characteristics. The scanning characteristics can be configured to fully or fractionally synchronize with vibration characteristics, as will be described in the following sections.

B. Full Synchronization of Vibration and Optical Scanning

Vibration characteristics and scanning characteristics can be synchronized to ensure that the vibration disturbance for a particular beam is always the same for each scan, or is always a fixed set of possible vibration disturbances for a set of scans. The former situation is referred to as full synchronization, the latter is referred to as fractional synchronization.

Full synchronization can be represented by having the vibration frequency be an integer multiple N of the scan rate. For example, assume that the scan rate is 1111 Hz, the vibration frequency is set to N×1111 Hz.

C. Fractional Synchronization of Vibration and Optical Scanning

Fractional synchronization includes the vibration characteristics having a vibration frequency that is out of phase with a scan rate of the scanning characteristics. For fractional synchronization, a vibration to scan phase shift is set, as introduced above in Section IV.A, so that for a given beam, over the course of a set of scans, each scan in the set has a different, fixed, phase shift between a point (i.e., a particular vibration phase) in the vibration period and a point scan period at which the corresponding beam's information is collected by the detector to determine beam blocking/transmission coefficients. As a result, each scan in the set measures the effect of a touch event on the beam for a different, fixed, vibration disturbance. Commonly, the vibration disturbances in the set will include the peak of the waveguide vibration upward, the trough of the waveguide vibration downward, a midpoint in the waveguide vibration (e.g., neutral position of the waveguide), however many other points are possible (e.g., at $\pi/8$, $\pi/16$ intervals in the vibration period, etc.). There may be as few as 2 scans in a set, or upwards of 50 or more depending on the implementation.

In fractional synchronization, the vibration frequency is any real number N multiple of the scan rate where N is not an integer (otherwise it would be full synchronization). The vibration to scan phase shift and the set of successive scans introduced above can be designed and configured based on a desired relationship between the vibration frequency and the scan rate. For example, assume that the vibration frequency is 1.25 times that of the scan rate, and then a 90 degree phase shift of vibration and 4 scans can be used to obtain all optical beams to characterize a touch event. For each scan, a 90 degree phase shift relative to previous scan is applied. Assume that a first scan has a vibration phase A, then a second scan has a vibration phase A+90°, a third scan has a vibration phase A+180°, and a fourth scan has a vibration phase A+270°.

FIGS. 9A-9B illustrate an example of fractional synchronization, according to one embodiment. FIG. 9A is a top view illustrating optical beams disturbed by vibration of the waveguide structure, according to one embodiment. In this example, there is a touch event in the center of the touch-sensitive surface. The touch is characterized by contact area 910. In the example of FIG. 9A, the vibration of the waveguide is half the scan rate ($\pi$), and so the waveguide will only be partially through a single period of vibration between two scans. Thus, the set introduced above contains two scans. Assume for sake of example that the scans occur at the maximum and the minimum of the waveguide surface's upwards and downwards motion.

In FIG. 9A, some optical beams are disturbed by the touch and are represented by solid lines 920A. However, optical beams that are supposed to be disturbed are not disturbed because vibration separates the object from the surface. These optical beams are represented by dash lines 930A. FIG. 9B illustrates the second scan in the set for this example, where the waveguide surface has vibrated halfway through a period to the opposite waveguide state (minimum/trough rather than maximum, for example). The 180-degree phase shift brings the object in contact with the surface to disturb optical beams that are not disturbed in the previous scan at the same contact area 910. These new disturbed optical beams are represented by solid lines 930B. By combining the first scan and the second scan in the set, all disturbed optical beams (920A and 930B) are obtained to characterize the touch event.

VI. Discrimination Based on Vibrated Waveguide Structure

Figure 10:
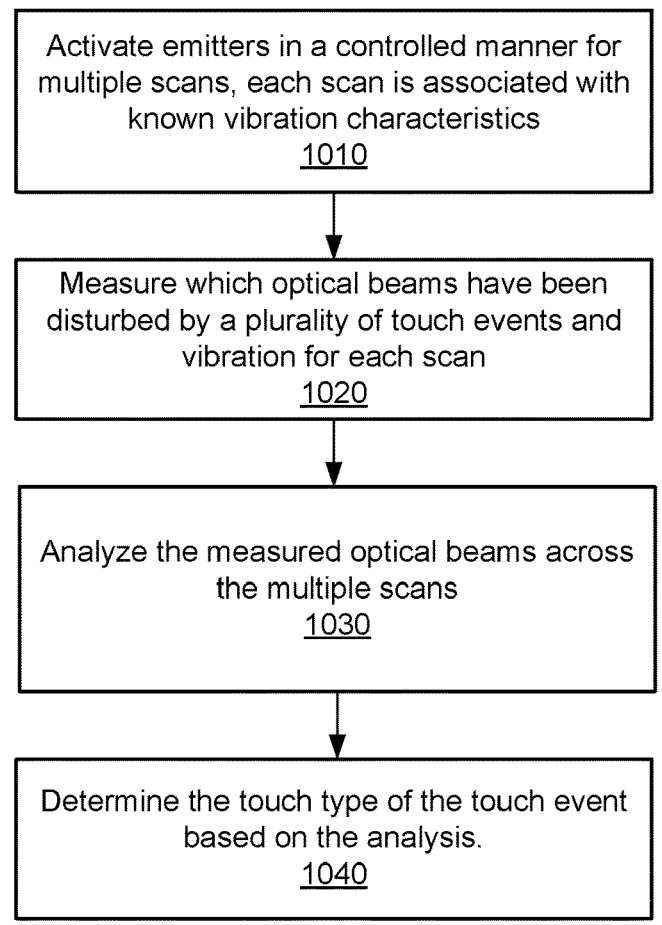
FIG. 10 is a flowchart of a process for determining a touch type based on vibration, according to an embodiment.

FIG. 10 is a flowchart of a process 1000 for determining a touch type based on vibration, according to an embodiment. This process 1000 is part of the processing phase 220 of FIG. 2, and may be performed by the optical touch-sensitive device 100 in some embodiments. Additionally, the process 1000 may include different or additional steps than those described in FIG. 10.

The optical touch-sensitive device 100 activates 1010 emitters in a controlled manner for multiple scans, each scan is associated with known vibration characteristics. The optical touch-sensitive device 100 activates emitters for scans using a set of scanning characteristics and a set of vibration characteristics.

The optical touch-sensitive device 100 measures 1020 which optical beams have been disturbed by a plurality of touch events and vibration of the waveguide structure for each scan. The optical touch-sensitive device 100 detects transmission coefficients Tjk for the disturbed optical beams jk caused by the touch events and the vibration of the waveguide structure.

The optical touch-sensitive device 100 analyzes 1030 the measured optical beams (e.g., the transmission coefficients) across the multiple scans. Different types of objects and touch events will produce different effects on the disturbed beams across the multiple scans. For example, a hard object such as a stylus may bounce off the top surface of the waveguide due to the vibration, causing one or more beams in one or more scans to not be disrupted, whereas a softer object such as a finger may merely absorb the vibration causing a different set or amount of beam disturbance across multiple scans. Particularly, fractional synchronization can give a complete picture of which beams were disrupted at different points in the period of the vibration of the waveguide, based on the disturbance in the beams in the set across multiple scans.

Similarly, full synchronization can also give a complete picture of which beams were disrupted at different points in the period of vibration of the waveguide based on the measured beam disruptions from proximal beams from the same scan. An assumption in this case is that these different nearby beams are each measuring a different part of the waveguide vibration and disruption from the touch event due to their slightly different positions (and corresponding E/D activation/detection times). Since in many instances these slightly different positions will still be a located under a touch event such as a finger or stylus, collectively these different beams can provide information about touch events.

This concept extends more generally, touch events are based on the material properties (e.g., softness, hardness, oily finger, dry finger, true touch event vs. false touch event, finger vs. stylus) of the contacting object, and differences between different types of touch events and the material properties themselves can be derived from the beam disturbances of the beams in the set.

From the above, one subset of determinations 1040 that can be made is what type of touch (or touch type) has been detected by the optical touch-sensitive device 100. The touch type is determined based in part on the analysis of the disturbed beams. As described above, different touch types have different properties (e.g., oily vs. dry) which cause different vibration disturbances, which are reflected in different disturbances of the optical beams in the set.

Many of the techniques described above in the processing phase for determining touch events (e.g., whether and where they occurred), can be used here in the context of full or fractional synchronization to distinguish between different touch types. For example, the candidate touch point technique, line imaging and tomography techniques, and template technique can be modified to include vibration characteristic information, scanning characteristic information, and scan set information such that which scans in a set correspond to which points in the period of the vibration of the waveguide are used to determine the touch type.

The above-described technique for determining touch type based on vibration can also be used to distinguish true touch from a false touch. For example, by using fractional synchronization, a true touch generates a different set of disturbed optical beams across a set of scans than a false touch would. For example, a first scan in a set, may show optical beams disturbed in the first scan are not disturbed in the second scan. However, a false touch generated from noise or disturbances may have same disturbed optical beams in both scans. Alternatively, a false contact may have an irregular change in the disturbed optical beams across a series of scans.

The above-described technique for determining touch type based on vibration can yet further be used to distinguish objects with different hardness (e.g., dry finger vs oily finger, finger vs instrument, different instruments). For example, oily finger is more easily attached to a vibrated surface than a dry finger, thereby the optical beams are less affected by vibration. Similarly, soft object (e.g., a finger) can be distinguished from hard object (e.g., a stylus). Different instruments with different hardness can be also distinguished based on interactions between the instrument and the vibrated surface, as further described below.

A. Detection Based on a Phase Shift

FIG. 11 shows examples of determining touch type based on a phase shift. FIG. 11A shows a diagram illustrating transverse vibration as a function of time for three scans, according to an embodiment. Axis 1110 represents vibration amplitude. Axis 1120 represents time. Between the first 1102 and second scan 1104 there is a 90 degree phase shift in the period of the waveguide vibration 1112, and also between the second 1104 and a third scan 1106). At time point 1122, the vibration is located at vibration peak in the first scan 1102. At time point 1124, the vibration is located at a neutral position in the second scan 1104. At time point 1126, the vibration is located at a vibration trough in the third scan 1106.

Figure 11A:
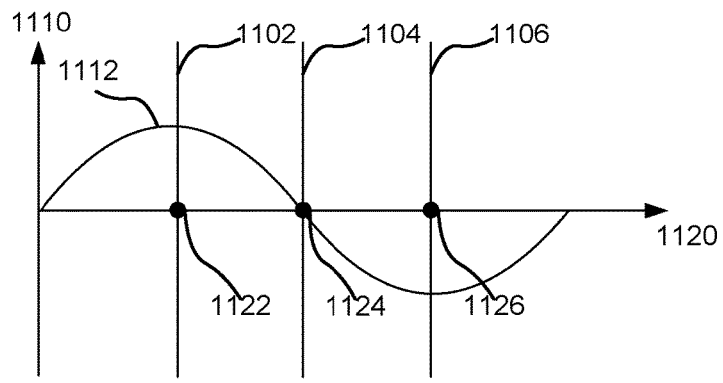
FIG. 11A is a diagram illustrating transverse vibration as a function of time for three scans, according to an embodiment.
Figure 11B:
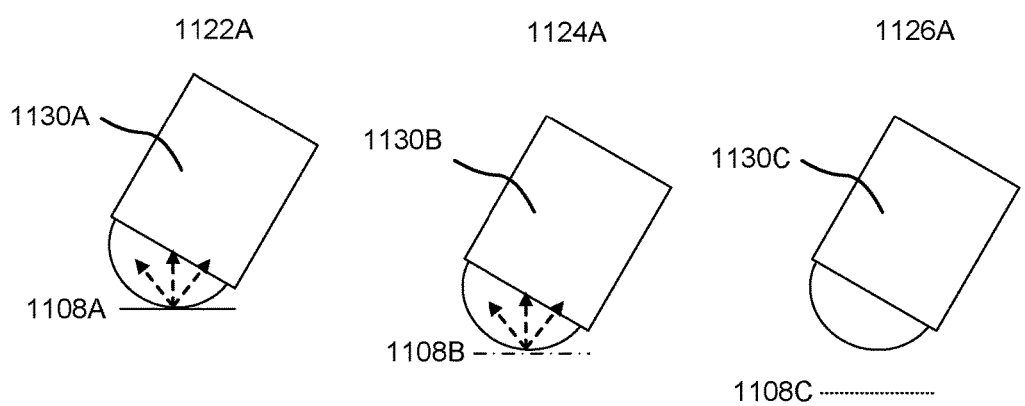
FIG. 11B is a side view illustrating an interaction between an object and vibrated surface at a time point for each scan illustrated in FIG. 11A, according to an embodiment.
Figure 11C:
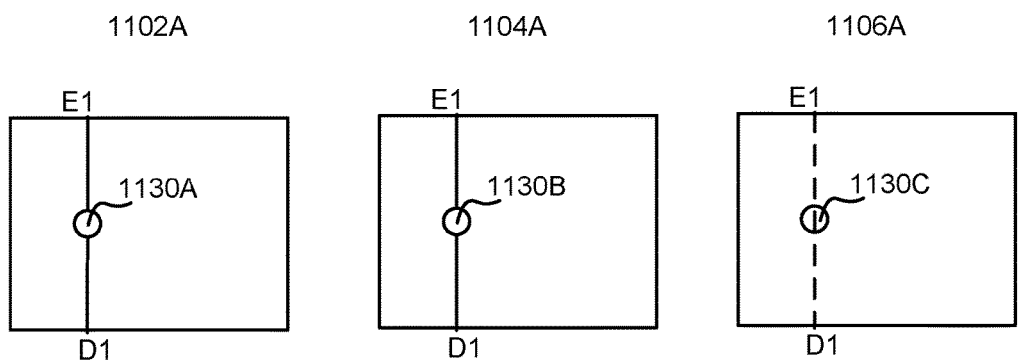
FIG. 11C is a top view illustrating an interaction between an object and vibrated surface at a time point for each scan illustrated in FIG. 11B, according to an embodiment.

FIG. 11B shows a side view illustrating an interaction between an object 1130 and vibrated surface 1108 at a time point for each scan, according to an embodiment. At the time point 1122A, the object 1130A touches the vibrated surface located at the vibration peak 1108A for the first scan 1102A. At the time point 1124A, the object 1130B touches the vibrated surface located at the neutral position 1108B for the second scan 1104A, but the object 1130C does not touch the vibrated surface located at the vibration trough position 1108C for the third scan 1106A. FIG. 11C shows a top view illustrating an interaction between an object 1130 and vibrated surface at a time point for each scan, according to an embodiment. Emitter E1 normally produces an optical beam that is received by detector D1. In the first scan 1102A and second scan 1104A, the touch between the object 1130 and vibrated surface blocks the optical beam from reaching detector D1. Thus, the optical beam is disturbed. In the third scan 1106A, vibration separates the object 1130C from the surface. D1 is able to detect optical beam transmitted from E1. Thus, the optical beam is not disturbed.

Figure 11D:
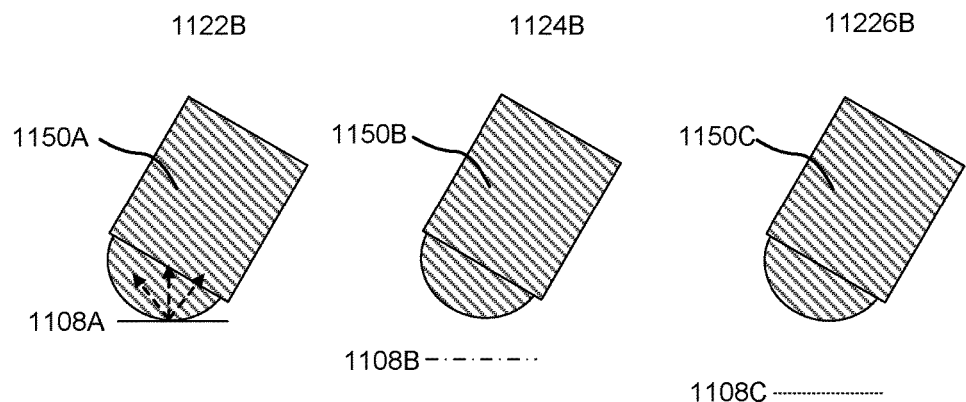
FIG. 11D is a side view illustrating an interaction between another object and vibrated surface at a time point for each scan illustrated in FIG. 11A, according to an embodiment.
Figure 11E:
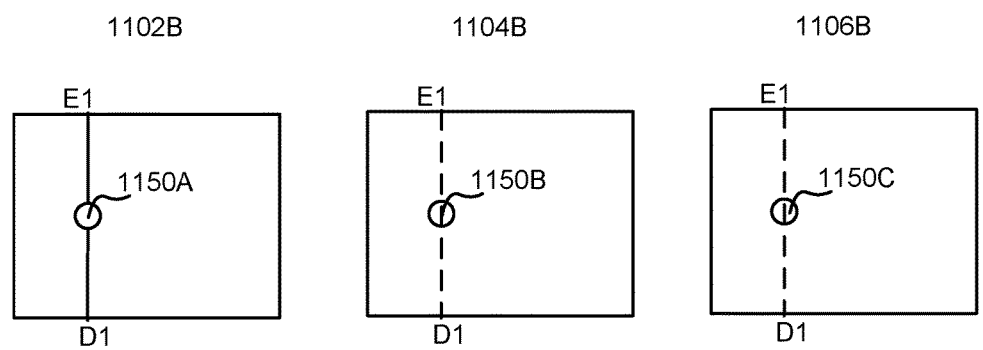
FIG. 11E is a top view illustrating an interaction between an object with different hardness and vibrated surface for each scan at a time point illustrated in FIG. 11D, according to an embodiment.

FIGS. 11D and 11E show a side view and a top view illustrating an interaction between another object 1150 and vibrated surface at a time point for each scan, respectively, according to one embodiment. In this example, the example object 1150 has different hardness compared with the example object 1130 shown FIG. 11B. The softer object 1130 is more likely to maintain contact with the top surface of the vibrating waveguide, whereas a harder object 1150 is less likely to maintain contact. In the first scan 1102B, the object 1150A touches vibrated surface located at 1108A and the touch blocks the optical beam from reaching detector D1. In the second scan 1104B and third scan 1106B, the object 1150 does not touch vibrated surface located at 1108B and at 1108C, and D1 is able to detect optical beam transmitted from E1. Thus, the optical beam is not disturbed by the object 1150. By comparing the differences of the optical beams in a series of scans between two objects, the two objects can be discriminated.

As introduced above, in one embodiment an object, such as a human finger or a stylus, may be associated with one or more templates including disturbed optical beams caused by interactions between the object and vibrated surface in a series of scans. For more information, see the description regarding touch event templates in Section III.D above. These templates may include separate templates (or combined templates) regarding expected beam disturbances for different scans in a set for different parts of a period of waveguide vibration. These templates may further include vibration and scanning characteristics information applicable to those templates. By comparing measured disturbed optical beams in a series of scans with the templates, the touch type of the object can be determined.

B. Multi-Touch Event Detection

FIGS. 11A-E show an example of determining a touch type for a single touch event using fractional synchronization, according to one embodiment. The device 100 can be also used to perform multi-touch event detection in a similar manner. For example, if two or more different objects land on a vibrated surface, the use of fractional synchronization and collection of a set of scans of each touch event within the period of a single vibration for each touch event can provide significant information about the material properties of each distinct touch event. For example, the touch event template technique described above, expanded to include fractional synchronization information (e.g., vibration and scanning characteristics) can be used to match stored templates against the scan information to distinguish touch events with different material properties. For example, such material properties may not only identify how many touch events have occurred and where, but also whether each touch event was a stylus vs. a finger.

Figure 12A:
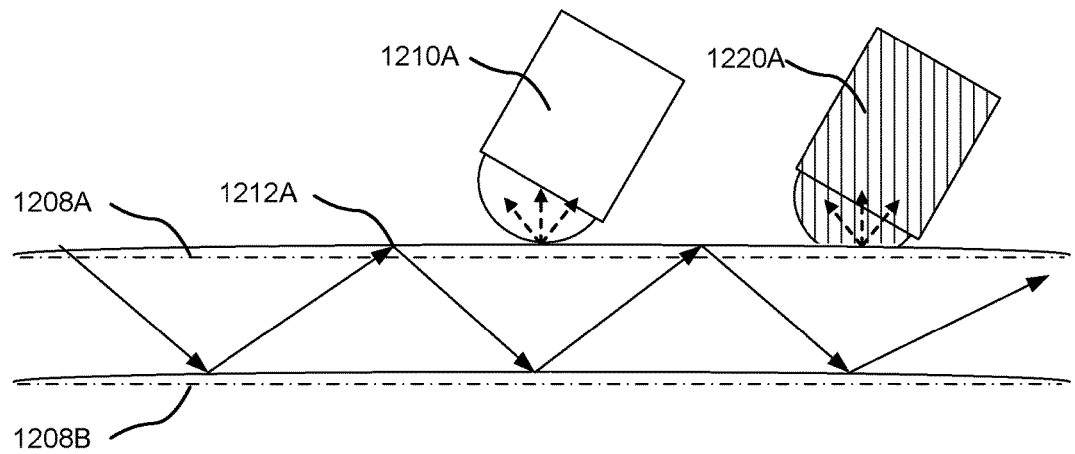
FIG. 12A is a cross sectional diagram of a waveguide structure moving up to a vibration peak, according to an embodiment.
Figure 12B:
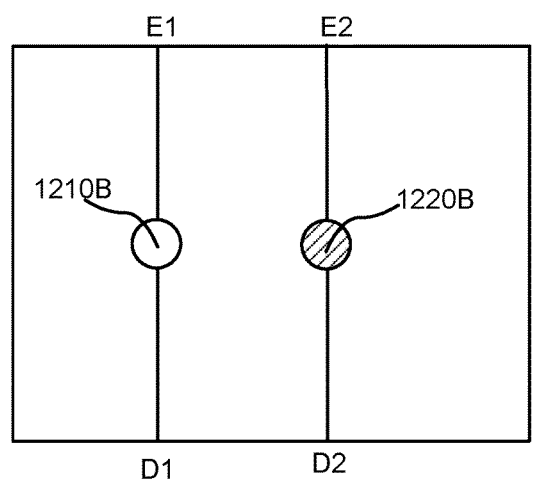
FIG. 12B is a top view illustrating an interaction between two objects and vibrated surface illustrated in FIG. 12A, according to an embodiment.
Figure 12C:
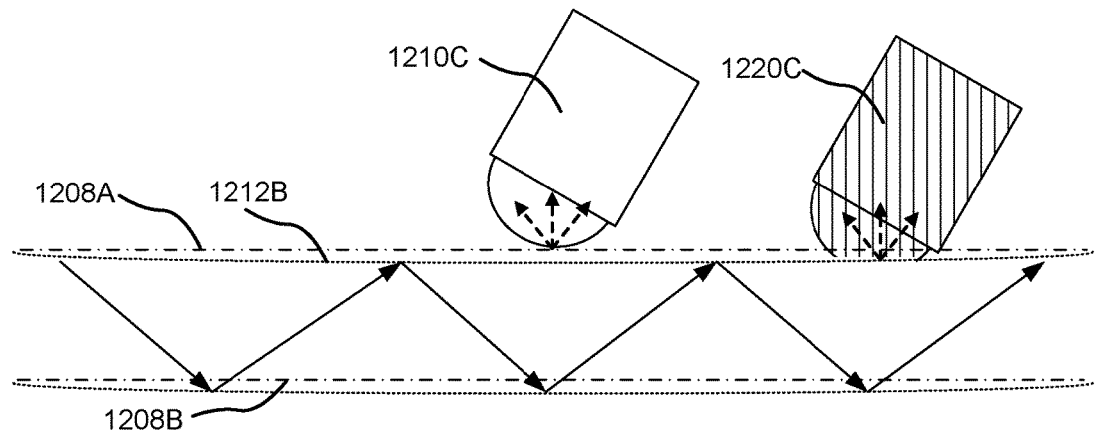
FIG. 12C is a cross sectional diagram of a waveguide structure moving down to a vibration trough, according to an embodiment.
Figure 12D:
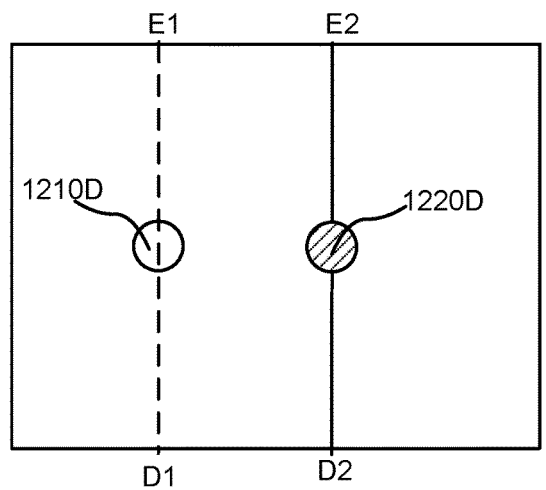
FIG. 12D is a top view illustrating an interaction between two objects and vibrated surface illustrated in FIG. 12C, according to an embodiment.

FIGS. 12A-D shows an example of determining touch types for multi-touch events using fractional synchronization, according to one embodiment. FIG. 12A is a cross sectional diagram of a waveguide structure 1208 moving up to a vibration peak according to an embodiment. When the top surface of the waveguide structure moves to a vibration peak 1212A, both objects 1210 and 1220 touch the top surface. FIG. 12B is a top view illustrating an interaction between two objects and vibrated surface illustrated in FIG. 12A according to an embodiment. The touches 1210B and 1220B block optical beams from reaching D1 and D2, respectively. FIG. 12C is a cross sectional diagram of a waveguide structure 1208 moving down to a vibration trough according to an embodiment. When the top surface of the waveguide structure moves to a vibration trough 1212B, only object 1220 touches the top surface, for example due to a difference in hardness between object 1220 and object 1210. Generally, a softer object 1220 is more likely to maintain contact with the top surface of the vibrating waveguide, whereas a harder object 1210 is less likely to maintain contact. FIG. 12D is a top view illustrating an interaction between two objects and vibrated surface illustrated in FIG. 12C, according to an embodiment. The touch 1220B blocks optical beams from reaching D2. The vibration separates the object 1210 from the top surface, and the optical beam is not blocked. By comparing differences between the disturbances of the optical beams crossing underneath or near the two objects across multiple scans (e.g., using templates or another suitable technique), the two objects can be distinguished.

C. Audible Vibration

Vibration may also provide audible sounds, which may be used to provide feedback to the user (e.g., in response to a touch input) or for any other purpose. The frequency of the audible sound is a function of the frequency of the vibration. The audible vibration can be used to distinguish objects. For example, if there is no touch event, the vibration produces a sound wave A. When an object touches a vibrated surface, a sound wave B is produced by the interaction between an object and vibrated surface. Different interactions between objects with different hardness and vibrated surface may produce different sound waves. The transducers making the audible sound may be the same or different from those that are actively being used to vibrate the waveguide, thereby allowing the audible frequency to shift while maintaining a constant set of vibration characteristics.

VII. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An optical touch-sensitive device comprising:
   a planar optical waveguide structure comprising a planar optical waveguide;
   emitters and detectors arranged along a periphery of the planar optical waveguide structure, the emitters producing optical beams that propagate through the waveguide structure via total internal reflection (TIR) to the detectors, the emitters and detectors having scanning characteristics including a scan rate; and
   transducers able to activate to vibrate a top surface of the planar optical waveguide structure, the vibration of the top surface characterized by vibration characteristics that are at least partially synchronized with the scanning characteristics, the vibration characteristics including a vibration frequency that is out of phase with the scan rate, wherein touches on the top surface of the waveguide structure disturb at least some of the optical beams, the touch-sensitive device determining touch events based on the disturbances.

2. The optical touch-sensitive device of claim 1, wherein the vibration characteristics further include at least one of a vibration period, a vibration phase, a vibration to scan rate phase shift, a vibration amplitude, or a vibration orientation.

3. The optical touch-sensitive device of claim 1, wherein the transducers create at least one of mechanical transverse vibration and mechanical longitudinal vibration in the top surface.

4. The optical touch-sensitive device of claim 1, wherein the transducers create spatially localized vibration.

5. The optical touch-sensitive device of claim 1, wherein locations of the transducers are selected from a group consisting of: proximal to an edge of the waveguide, underneath the waveguide, on top of the waveguide, proximal to an edge of a display, underneath the display, and on top of the display.

6. The optical touch-sensitive device of claim 1, wherein the transducers comprise electromechanical transducers.

7. The optical touch-sensitive device of claim 1, wherein the transducers vibrate the planar optical waveguide, thereby vibrating the top surface of the planar optical wave guide structure.

8. The optical touch-sensitive device of claim 1, wherein the waveguide structure comprises a vibration layer on top of the top surface of the planar optical waveguide; and
   wherein the transducers vibrate the vibration layer, thereby vibrating the top surface of the planar optical waveguide structure.

9. The optical touch-sensitive device of claim 8, wherein the planar optical waveguide and the vibration layer are transparent.

10. The optical touch-sensitive device of claim 1, wherein the scanning characteristics further include at least one of a vibration to scan rate phase shift, the number of emitters, the number of detectors, an emitter activation time, a detector activation time, a detector sampling rate, or a rate of pulse transmission.

11. A method for determining a touch type for a touch event by an object on an optical waveguide structure optically coupled to emitters and detectors, the emitters producing optical beams that propagate through the waveguide structure via total internal reflection (TIR) to the detectors, the touch event disturbing at least some of the optical beams, the method comprising:
   activating the emitters and detectors in a controlled manner for multiple scans, each scan associated with a set of scanning characteristics including a scan rate;
   activating at least one transducer to vibrate a top surface of the optical waveguide structure, the vibration of the top surface associated with a set of vibration characteristics that are at least partially synchronized with the scanning characteristics, the vibration characteristics including a vibration frequency that is out of phase with the scan rate;
   measuring the optical beams to determine which optical beams have been disturbed by the touch event for each of the scans;
   analyzing together the measured optical beams of the scans based on the vibration characteristics and the scanning characteristics; and
   determining the touch type of the touch event based on the analysis.

12. The method of claim 11, wherein the vibration characteristics further include at least one of a vibration period, a vibration frequency, a vibration phase, a vibration to scan rate phase shift, a vibration amplitude, and a vibration orientation.

13. The method of claim 11, wherein the scanning characteristics further include at least one of a scan rate, a vibration to scan rate phase shift, a number of emitters, a number of detectors, emitter activation time, detector activation time, detector sampling, and rate of pulse transmission.

14. The optical touch-sensitive device of claim 1, wherein the vibration frequency defines a vibration period, the device determining touch events based on measurements obtained by a set of scans, with each scan in the set taken at a different point in the vibration period.

15. The optical touch-sensitive device of claim 14, wherein the set of scans includes a scan taken at a peak of the waveguide vibration, a scan taken at a trough of the waveguide vibration, and a scan taken at a midpoint of the waveguide vibration.

16. The optical touch-sensitive device of claim 1, wherein the vibration frequency is 1.25 times the scan rate.

17. The method of claim 11, wherein activating the at least one transducer creates a spatially localized vibration.

* * * * *